United States Patent
Silva et al.

(10) Patent No.: US 11,675,857 B2
(45) Date of Patent: Jun. 13, 2023

(54) MOBILE USER PROFILE CREATION AND APPLICATION

(71) Applicant: NRBY, INC., Manchester, NH (US)

(72) Inventors: Michael Silva, Lowell, MA (US); Brittany Campbell, Nashua, NH (US); Sean Roy, Stratham, NH (US); Tatsuki Nakano, Nashua, NH (US); Rindress Macdonald, Hollis, NH (US); Sett Paing Oo, Nashua, NH (US); Mohamed Fadlalla, Manchester, NH (US); Kurt Dobbins, New Castle, NH (US); Mark Sexton, Merrimack, NH (US)

(73) Assignee: NRBY, INC., Manchester, NH (US)

( * ) Notice: Subject to any disclaimer, the term of this patent is extended or adjusted under 35 U.S.C. 154(b) by 0 days.

(21) Appl. No.: 15/410,278

(22) Filed: Jan. 19, 2017

(65) Prior Publication Data

US 2017/0206278 A1    Jul. 20, 2017

Related U.S. Application Data

(60) Provisional application No. 62/280,337, filed on Jan. 19, 2016.

(51) Int. Cl.
*G06F 16/00* (2019.01)
*G06F 16/9535* (2019.01)

(52) U.S. Cl.
CPC .............. *G06F 16/9535* (2019.01)

(58) Field of Classification Search
CPC ......... G06F 17/30867; G06F 17/30864; G06F 17/30991; G06F 17/30696; G06F 16/9535; G06Q 30/02; H04L 12/1859
See application file for complete search history.

(56) References Cited

U.S. PATENT DOCUMENTS

| | | | |
|---|---|---|---|
| 2007/0112758 A1* | 5/2007 | Livaditis | G06F 16/338 |
| 2008/0294603 A1* | 11/2008 | Ranjan | H04W 4/029 |
| 2009/0027223 A1* | 1/2009 | Hill | G06Q 30/02 340/686.6 |
| 2012/0313777 A1* | 12/2012 | Zazula | G06Q 30/02 340/539.13 |
| 2013/0191373 A1* | 7/2013 | Kaul | G06F 16/2455 707/722 |

(Continued)

*Primary Examiner* — Tony Mahmoudi
*Assistant Examiner* — Suman Rajaputra
(74) *Attorney, Agent, or Firm* — Procopio, Cory, Hargreaves & Savitch LLP

(57) ABSTRACT

A method, apparatus, computer readable medium for maintaining a user profile at a web service, including receiving at least one search term from a mobile application, generating a profile associated with an identifier for the mobile application, and storing the received at least one search term from the mobile application in connection with the identifier in the profile. The web service may generate an anonymous identifier for the mobile application, wherein the at least one search term from the mobile application is stored in connection with the anonymous identifier in the profile. The web service may receive and store a location and other information from the mobile application. The profile may be updated so that additional searches can be performed based at least in part of the maintained profile.

15 Claims, 17 Drawing Sheets

SEQUENCE DIAGRAM

(56) References Cited

U.S. PATENT DOCUMENTS

| | | | | |
|---|---|---|---|---|
| 2013/0339334 A1* | 12/2013 | Brown | ................ | G06F 16/9535 |
| | | | | 707/706 |
| 2015/0189473 A1* | 7/2015 | Makris | .................. | H04W 4/021 |
| | | | | 455/456.3 |
| 2016/0034961 A1* | 2/2016 | May | .................... | G06Q 30/0261 |
| | | | | 705/14.58 |
| 2017/0103080 A1* | 4/2017 | Quong | ................ | G06F 16/9537 |

\* cited by examiner

FIG. 6 SEQUENCE DIAGRAM

Fig 7 First Time Opening App

Fig 8 Second Time Opening App

Fig 9 First Time Leaving Region

Fig 10 Second Time Leaving Region

Fig 11 Third Time Opening App

Fig 12 Fourth Time Opening App

MOBILE USER PROFILE CREATION AND APPLICATION

CROSS-REFERENCE TO RELATED APPLICATION

This application claims the benefit of U.S. Provisional Application Ser. No. 62/280,337, entitled "ANONYMOUS MOBILE USER PROFILE CREATION AND APPLICATION" and filed on Jan. 19, 2016, which is expressly incorporated by reference herein in its entirety.

BACKGROUND

Field

The present disclosure relates to the ability of a mobile application to collect user profile data about the mobile device user in the form of search terms, geographic locations, and other user preferences, store the profile data, and use the stored information to make proactive recommendations to the user about things like restaurants, hotels, and entertainment activities.

Background

The cell phone market is transitioning from 'feature' phones to 'smart' mobile devices. Feature phones primarily allow phone calls and text messages. Smart mobile devices (phones, tables, etc.) allow the functionality of a laptop computer in a smaller mobile device. Smart mobile devices can connect to the Internet either over the cell phone network or by using Wi-Fi connectivity. Smart mobile devices can run small software applications known as apps. Smart mobile devices can be aware of the device location through the use of a GPS chip, cell phone tower triangulation, or a Wi-Fi network location mapping.

Certain applications track the location of the smart mobile device through the use of some or all of the methodologies available to the device. Navigation software apps are an example of one class of applications that track the location of the device with high precision and high battery usage in order to be able to provide detailed turn-by-turn navigation instructions. Other applications use Region Monitoring to detect when a user enters or exits a predefined region. Region Monitoring can be more battery efficient than location tracking.

A mobile application may allow the user to search for events or businesses based on the current location of the user. An application may further allow the user to refine the search based on keywords matching. These keywords may be explicitly specified for each search, or automatically provided by the mobile application based on a stored profile for the mobile application user.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect of the invention is that the identity of the owner of the smart phone may never be known to the system. A username might not be required. The user may never be required to enter an email address or phone number. The system might not collect the phone UDID. The user of the smart phone must enable location services on the phone.

Mobile device users who wish to locate businesses and items of interest may use a mobile application to search for these things. The search is delivered to a web server to execute and return search results. The web server may search through items in the system's database, as well as items from external databases such as search engine databases and travel databases.

The mobile application may create a record for the mobile device application user on the web server. In one example, the mobile user record might not contain any Personally Identifiable Information (PII) about the user. The mobile application may associate explicit and implicit search criteria with the anonymous user record on the web server. Explicit information may be search terms, user preferences, or venue types. Implicit search criteria may be current location, historical locations of visited venues, and past search results. In another example, a user may log in to the mobile application at their mobile device. Thus, the user profile might be associated with a user identifier and password with which the user logs in to the application.

As described in U.S. Application No. 62/171,900 METHOD FOR TAG BASED FILTERING ON GEOGRAPHIC REGIONS, DIGITAL ASSETS, MESSAGES, AND ANONYMOUS USER PROFILES and U.S. Application No. 62/214,686 BATTERY EFFICIENT HYBRID MOBILE DEVICE LOCATION MONITORING, businesses may establish geographic Regions over the business venue. The mobile device is capable of monitoring these regions to determine when the mobile device enters and exits a region that corresponds to a venue.

When the mobile application user searches for venues, some of the search results may be venues with Regions being monitored by the mobile device. After receiving search results, the mobile application may convey to the web server that the mobile device had entered the Region for the venue of one of the search results. Likewise, when the mobile device exits the Region for the venue, the mobile application may convey to the web server that the mobile device has exited the Region for the venue. The mobile device's entrance into and exit out of the region may be associated with the anonymous user record for the application user and may be used to refine future search results with the knowledge that the mobile application user had actually visited the venue in the past.

In the future, when the mobile application user uses the application in a similar geographic location to search for venues, the application may proactively use the information stored with the mobile user record to suggest venues based on previous search keywords and previously visited venues.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Other objects, features and advantages will occur to those skilled in the art from the following description of a preferred embodiment and the accompanying drawings in which.

DETAILED DESCRIPTION

Figure 1:
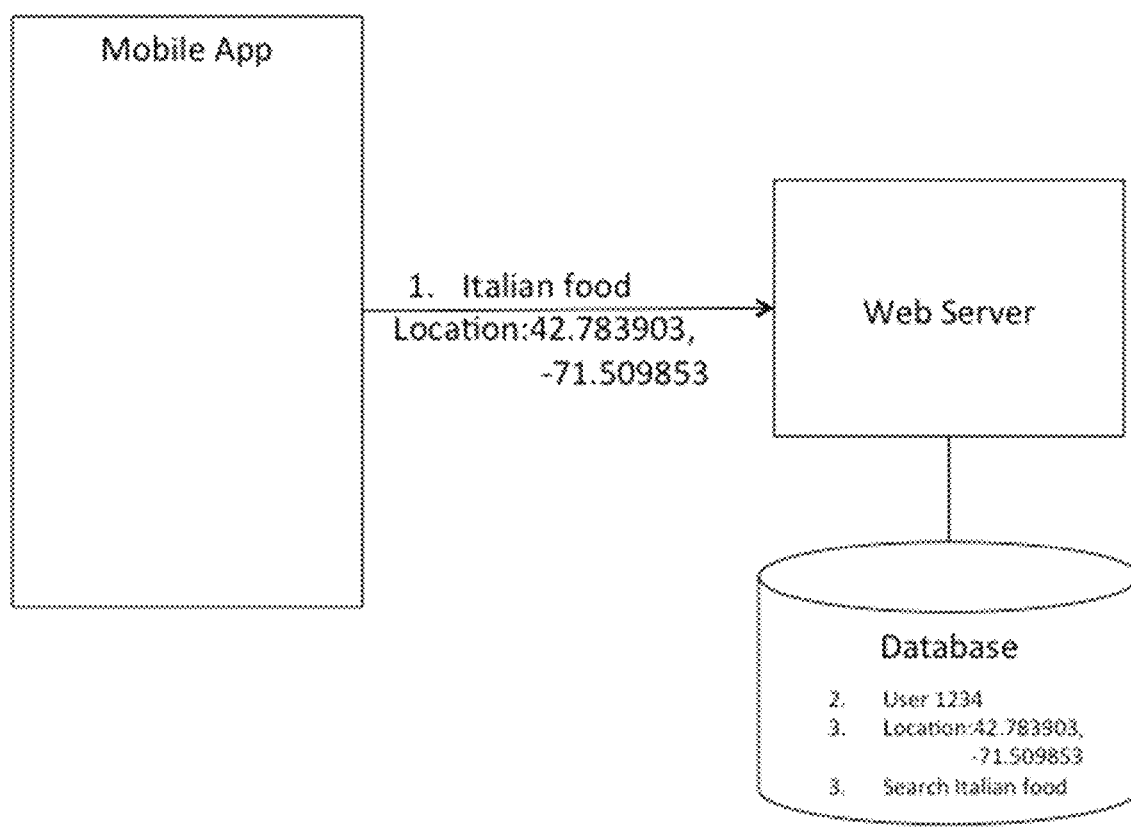
FIG. 1 is a block diagram describing the information flow of the first search from the mobile application.

Aside from the preferred embodiment or embodiments disclosed below, is the aspects presented herein are capable of other embodiments and of being practiced or being carried out in various ways. Thus, it is to be understood that the invention is not limited in its application to the details of construction and the arrangements of components set forth in the following description or illustrated in the drawings. The claims hereof are not to be limited to any particular embodiment. Moreover, the claims hereof are not to be read restrictively unless there is clear and convincing evidence manifesting a certain exclusion, restriction, or disclaimer.

Mobile applications are capable of communicating with web servers for the purpose of searching databases. Many of these search apps require that a user sacrifice anonymity in order to be able to store information like preferences, previous searches, and locations. A mobile application can store all information specific to the user of the mobile application by assigning a unique identifier to a database record and communicating that unique identifier back to the mobile application to be used in future requests. This may be accomplished, through the assignment and exchange of an anonymous token, as described in connection with U.S. application Ser. No. 14/145,391, titled "SYSTEM AND METHOD FOR ANONYMOUS DELIVERY OF GEOGRAPHICALLY SPECIFIC RICH MEDIA INFORMATION and filed on Dec. 31, 2013, the entire contents of which are incorporated herein by reference.

While the user profile may be created and maintained in an anonymous manner in one example, in another example, a user may log in to the mobile application at their mobile device. Thus, in the second example, the user profile might be associated with a user identifier and password with which the user logs in to the application.

FIG. 1 shows how the very first search request for Italian food from a certain location from such an application can trigger a creation of a user record at a web server. The user record may be associated with a unique identifier at the web server. The mobile application may receive user input search term(s), in this example "Italian Food." The search term(s) is transmitted to the web server. Additionally, a location of the mobile application, which also identifies a location of the mobile device and presumably the user, may be transmitted to the web server. The search may be conducted using the location and the search terms "Italian Food" in order to return search results to the mobile application. The search may be delivered to a web server to execute and return search results. The web server may search through items in the system's database, as well as items from external databases such as search engine databases and travel databases.

In addition to performing the search, the search terms and location received from the mobile application may be stored by the web server in a database in order to begin generating a dynamic user profile that can be used to identify search results that may be more relevant/desirable for that particular user.

Thus, the mobile application may create a record for the mobile device application user on the web server. The mobile application user record does not contain any Personally Identifiable Information (PII) about the user. The profile for the mobile application associates explicit and implicit search criteria with the anonymous user record on the web server. Explicit information may be search terms, user preferences, or venue types. Implicit search criteria may be current location, historical locations, and past search results.

The user profile may be generated and stored in an anonymous manner, e.g., identifying the mobile application using an anonymous token that does not require personally identifiable information. The user of the smart phone downloads and installs an application on the smart phone. The application learns the anonymous token from the notification service. The application uses this anonymous token to register the smart phone with the web service. The web service stores the anonymous token and assigns a new identification number for the mobile device. Periodically, the application on the smart phone device checks in to update the token (if it has changed) and any other information stored during registration such as the version of the mobile application. This allows a mobile application profile to be maintained for the user without storing any personal identifying information so that the user does not sacrifice anonymity. In FIG. 1, the anonymous token is 1234. The profile includes the search term and the location of the mobile application, and therefore, the mobile device, at which the search term was input by the user.

Figure 2:
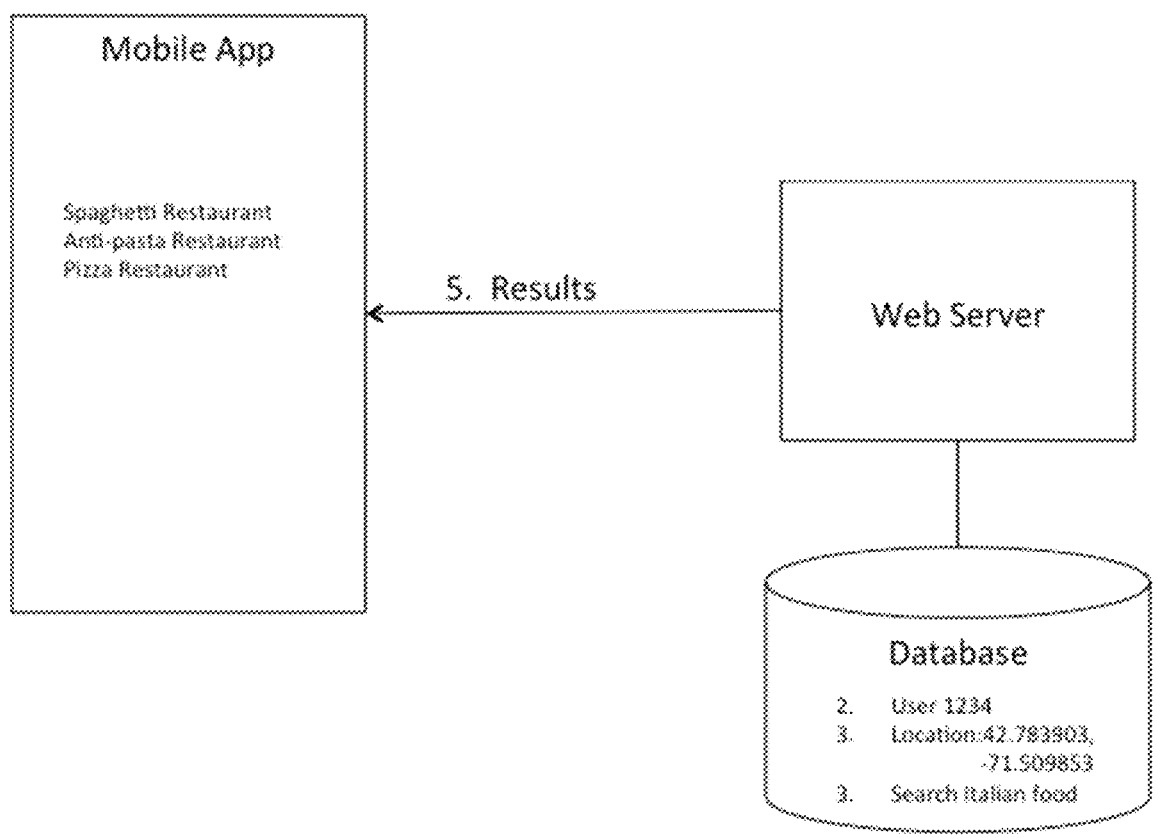
FIG. 2 is a block diagram showing the results of the first search.

FIG. 2 shows how the results are returned to the user after the search is performed. As this was the first search performed for the mobile application, there was no previous user profile used in performing the search. The order of the results is important. In FIG. 2, the first result is Spaghetti Restaurant, and the last result is Pizza Restaurant.

As described in previous U.S. application No. 62/137,046 METHOD FOR OPTIMIZING MOBILE DEVICE REGION MONITORING AND REGION MANAGEMENT FOR AN ANONYMOUS MOBILE DEVICE, 62/171,900 METHOD FOR TAG BASED FILTERING ON GEOGRAPHIC REGIONS, DIGITAL ASSETS, MESSAGES, AND ANONYMOUS USER PROFILES and 62/214,686 BATTERY EFFICIENT HYBRID MOBILE DEVICE LOCATION MONITORING, businesses may establish geographic Regions surrounding a business venue. A mobile application at the mobile device may be capable of monitoring these regions to determine when the mobile device enters and exits a region that corresponds to a venue.

Thus, when search results are returned, the mobile application may begin to monitor Regions associated with any of these search results.

Figure 3:
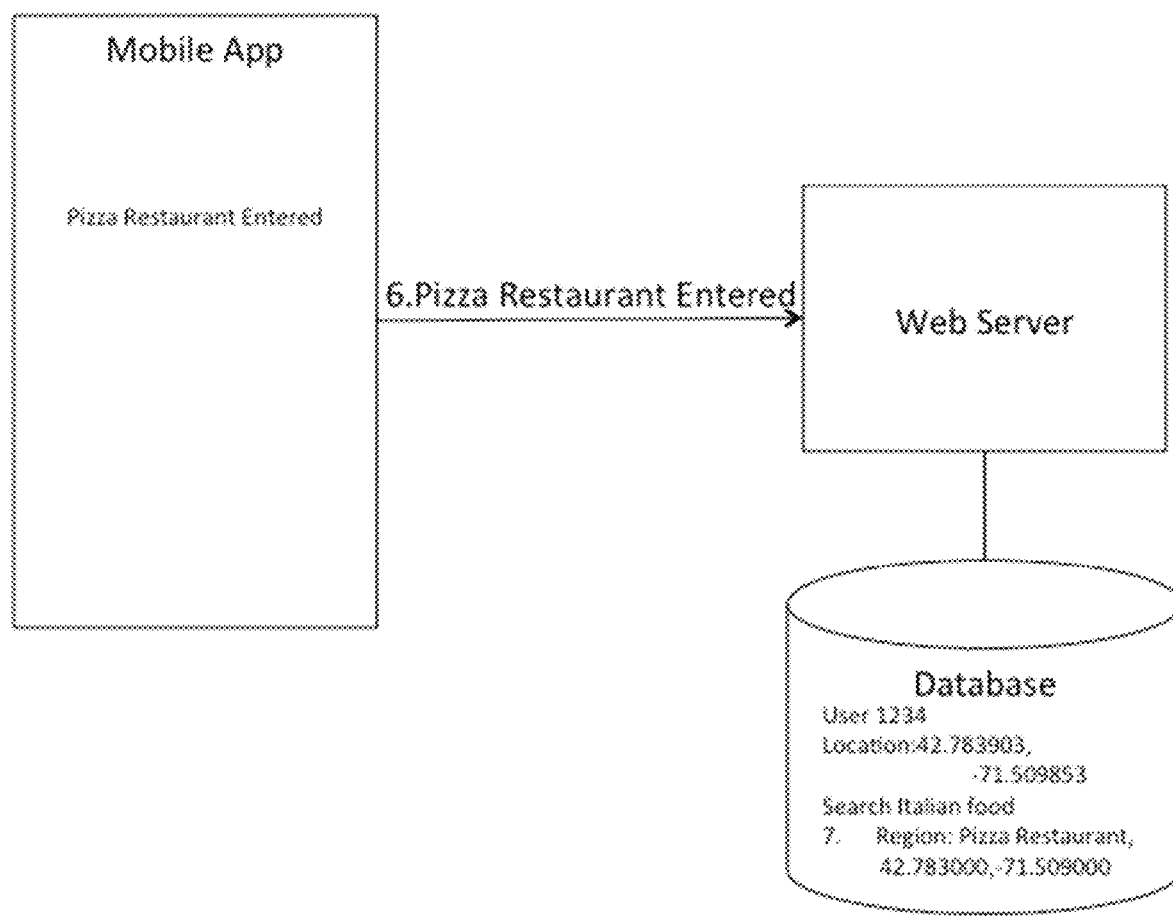
FIG. 3 is a block diagram showing the information flow of a Region Enter event.

FIG. 3 shows that when the Pizza Restaurant Region is entered, the mobile application can communicate with the web server to notify the web server that the Pizza Restaurant has been entered. The web server can store this information in the database, associated with the user record for that mobile app. This enables the profile to identify user preferences by determining which search results the user pursues.

Figure 4:
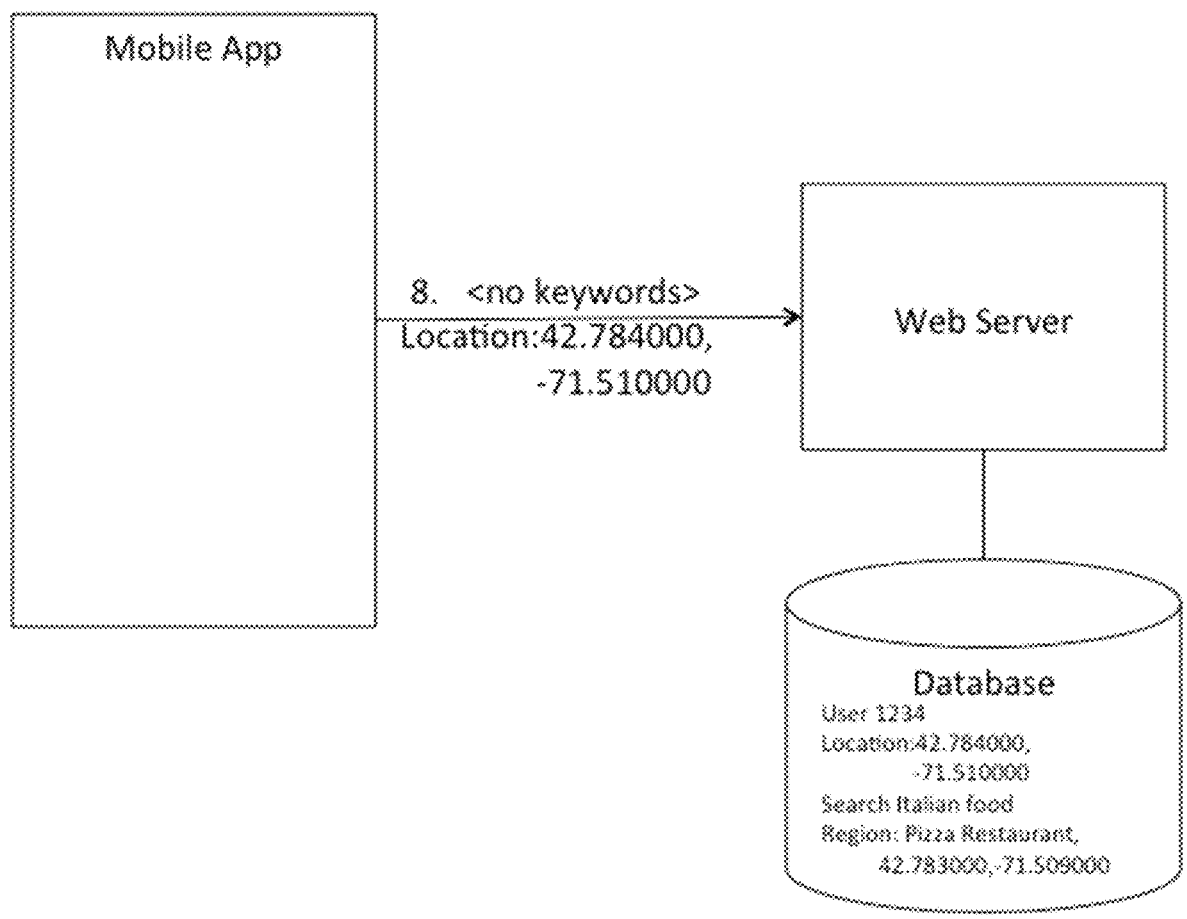
FIG. 4 is a block diagram describing the information flow of the second (and subsequent) search from the mobile application.
Figure 5:
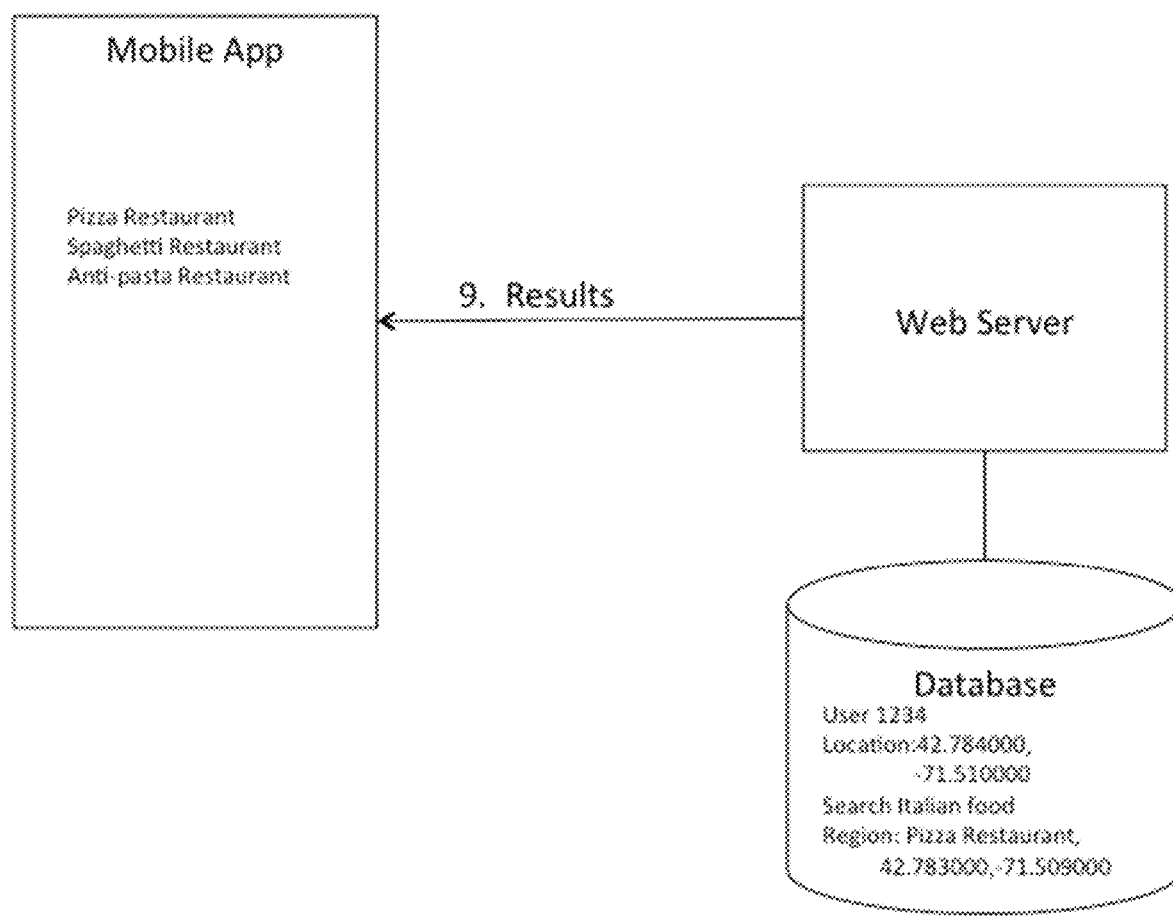
FIG. 5 is a block diagram showing the results of the second search.

FIG. 4 shows how a second search might look coming from the mobile application. In FIG. 4, the user provides no search keywords. The mobile application only transmits a location of the mobile device. The system utilizes the previous keywords associated with the mobile application user, combined with the knowledge of the location of the search and the Pizza Restaurant being previously entered, as illustrated in FIG. 3, in order to perform a search and identify search results of possible interest to the user. FIG. 5 shows how the search results for the second search may be modified. The order of the results is important, in FIG. 5. The first result is Pizza Restaurant. The second result is Spaghetti Restaurant. The last result is Anti-pasta Restaurant. This first result is returned because based on the previous search results, the user entered the Pizza Restaurant. Therefore, the search results can be weighted or ordered to place the Pizza Restaurant in front of other search results. Thus, the search conducted in FIG. 4 and the results returned in FIG. 5 may consider any of previous search terms and previous behavior stored in the profile for the mobile application.

Although FIG. 4 illustrates a result being provided to the user without entry of a search term, the mobile application may also receive search term(s) from the user. The web server may use the entered search terms in combination with the information in the user profile in order to return results to the mobile application.

Figure 6:
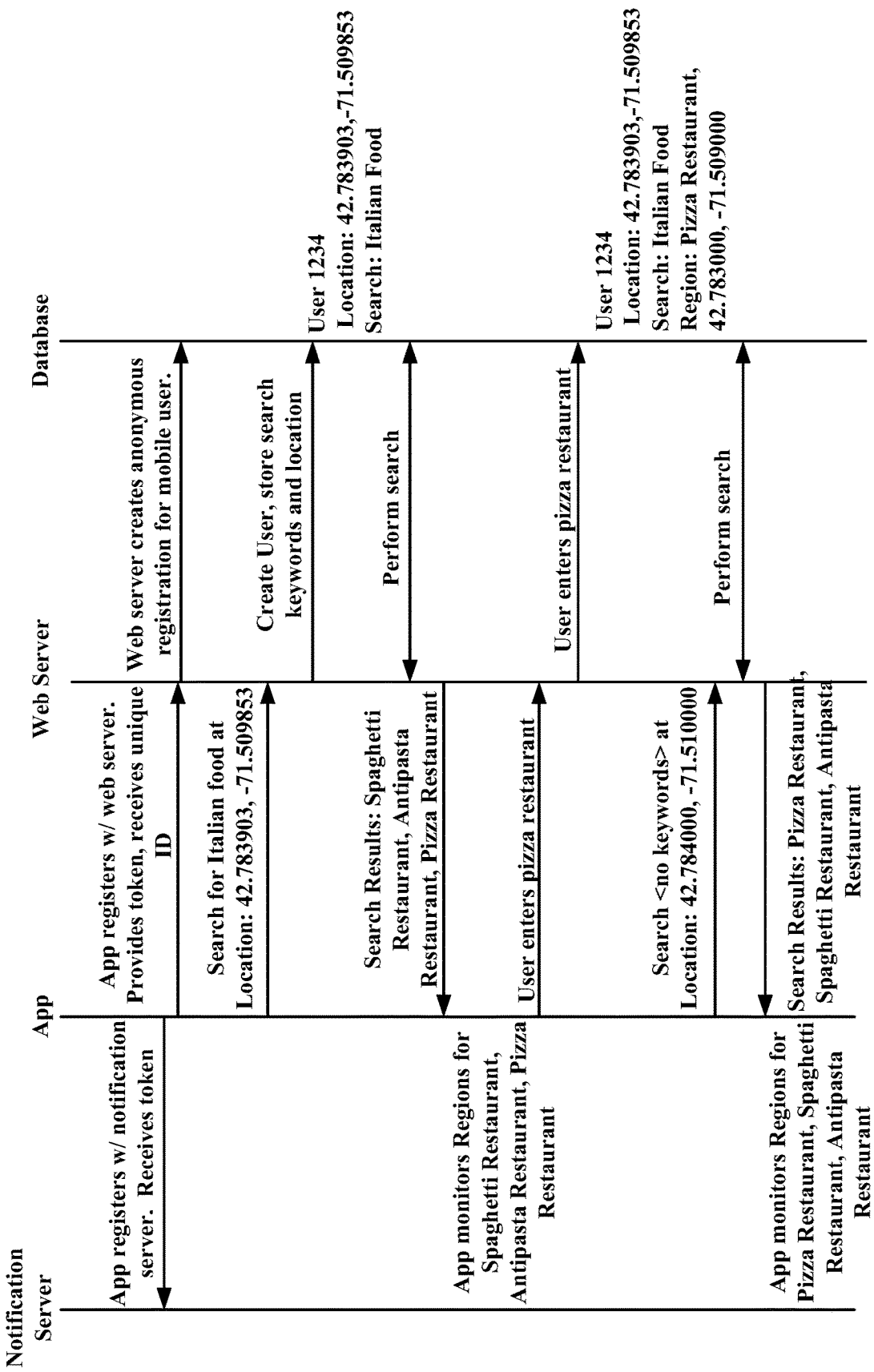
FIG. 6 is a sequence diagram depicting the interactions described in FIG. 1 through FIG. 5.

FIG. 6 illustrates aspects of an example method of generating and maintaining a dynamic user profile, e.g., as described in connection with FIGS. 1 through 5. In FIG. 6, the user enters first search terms "Italian Food." These search terms, along with the location of the mobile application/mobile device, are transmitted to the web server. The Web Server may create a user profile, including the anonymous token obtained by the mobile application from by a notification service. Examples of notification services include, e.g., Google Cloud Messaging or Apple Push Notification Service. The anonymous token may be generated by the notification service without receiving any personal identifying information from the user. The registration by the mobile application may be stored by the web service without requiring any personal identifying information. The web service returns a unique identifier to the mobile application as a response to the registration. This unique identifier from the web service may be used to identify that mobile device to the web service for all future requests. The keywords and location received from the mobile application are stored in connection with the unique identifier and the anonymous token in a database. In another example, a user may log in to the mobile application at their mobile device. Thus, the user profile might be associated with a user identifier and password with which the user logs in to the application rather than a token.

The web server performs the search and returns the search results to the mobile application. After receiving the search results, the mobile application may perform region monitoring for regions associated with the search results. When the user enters a region associated with one of the search results, a message is transmitted to the web server, and the user profile is updated to store the entry event with the user entry. This can be used to show a stronger user preference for the search result, e.g., Pizza Restaurant.

Later, the user may open the mobile application. Without receiving any search terms from the user, the mobile application may transmit the location of the mobile device to the web server, and the web server may perform a search to identify possible results of interest to the user based on the location, the user profile previously stored at the database, and venues that were previously visited.

Additionally, the user may enter search terms, and a search may be performed by the web server based both on the search terms and location of the mobile device, and using the information stored in the user profile.

Furthermore, the user profile may be updated with any of the location of the device, if no search terms are entered, with the search terms and the location, and with the second set of search results.

As well, once a second set of search results are returned to the mobile application, the mobile application may begin to perform region monitoring for the second set of search results. If the mobile device enters one of these second regions, this information may be transmitted to the web server and used to update the user profile by tracking that a search result venue was entered by the mobile application user.

As the user profile is updated, the search results may be tailored to the specific interests of that particular user. This can all be accomplished in an anonymous manner that does not require the user to provide personal identifying information.

Figure 7:
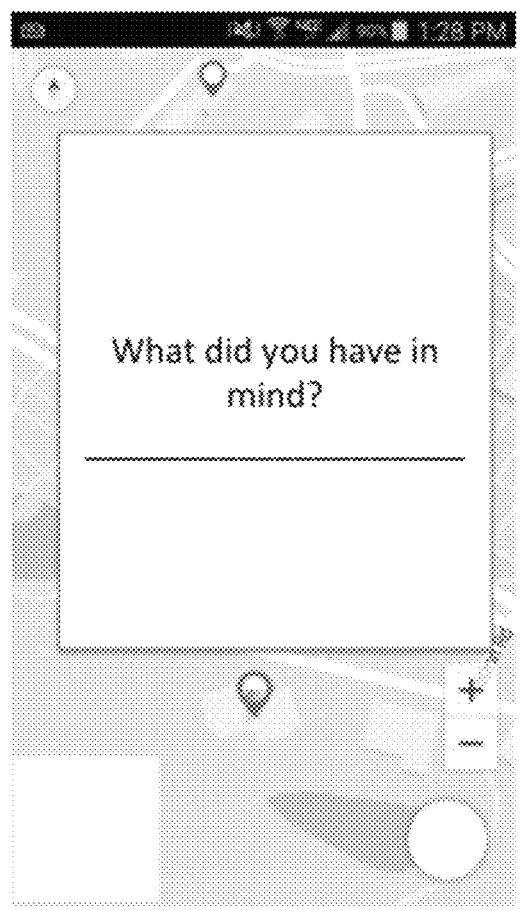
FIG. 7 is a representation of the user interface of a mobile application on the first search.

FIG. 7 illustrates an example mobile application user interface prompting the user to enter the first search. Since the system knows nothing about the user, the only recommendations that can be made for the user would be based on location. Once the user enters search keywords, these search terms and the location of the mobile device can be used to return a first set of search results.

Figure 8:
FIG. 8 is a representation of the user interface of a mobile application on the second search.

FIG. 8 illustrates an example mobile application user interface showing a possible second search result that can be presented to the user without user entry of a search term, using the previously received user information, e.g., search terms and location. As the user has made a previous search and the system has information recorded about that search, recommendations can be made for the user based on the proximity of the current location to the proximity of past locations. The recommendations can be taken, or the mobile application user can enter a new search. In the event of a new search, the web server will add the new search information to the user profile in the database. The user profile will be dynamically expanded based upon information entered by the user in subsequent searches.

As described in connection with FIG. 6, the mobile application may perform region monitoring for the search results received from the web server in order to identify when the mobile device enters a region associated with one of the search results.

Figure 9:
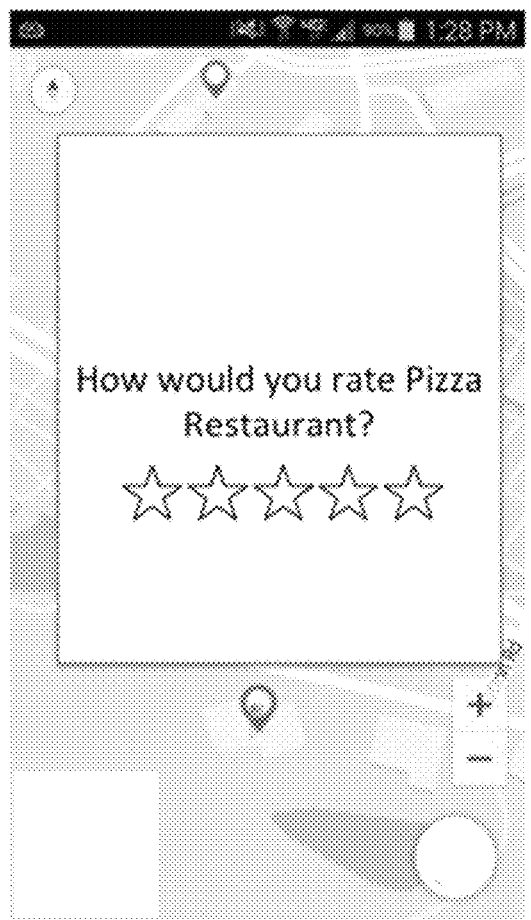
FIG. 9 is a representation of user ratings that a mobile application can request when the mobile device leaves a region.

In addition to informing the web server when a user enters a region, the mobile application may solicit user feedback regarding their experience with the search result. FIG. 9 illustrates an example mobile application user interface asking the user to rate a region, in this example, the Pizza Restaurant. Since the region is being monitored, the mobile application is aware of when the region is exited. If the region is exited and it was part of the search recommendations made by the mobile application, the mobile application may present a user interface to the user asking the user to rate the region. These ratings can be stored in the web server database for future use. The ratings may be private to the individual anonymous user, available to a subset of other users, or publicly available to all users. This type of feedback may be requested by the application the first time the region is exited, or if no other ratings for the region exist by this user, or every time the region is exited.

Figure 10:
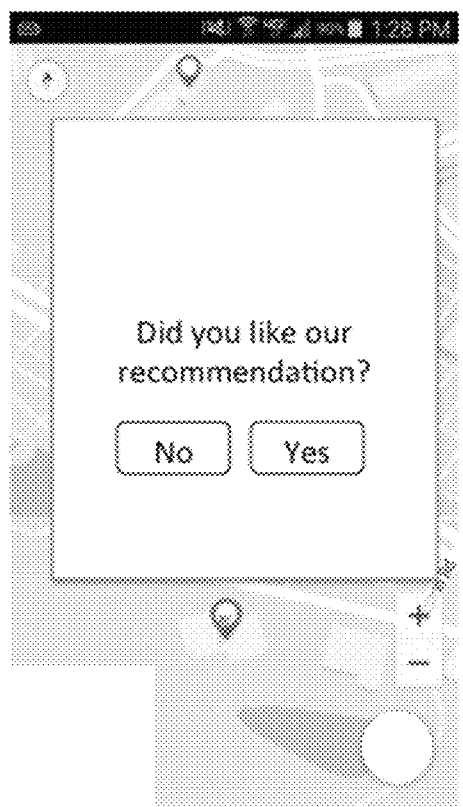
FIG. 10 is a representation of the mobile application gathering feedback on recommendations.

FIG. 10 illustrates an example mobile application user interface prompting the user to rate the recommendation rather than just rating the venue associated with the search result. Since the mobile application is monitoring the region and is aware that the region was one of the recommendations that it made to the user, the mobile application may gather feedback on the recommendations to improve the recommendation engine in the future. The effectiveness of the recommendation may also be stored in the web server database and used as a criterion to making future recommendations for the user or for including the region in future recommendations. This type of feedback may be requested by the application when the region is exited.

When the mobile application user searches for venues, some of the search results may be venues with Regions being monitored by the mobile device. The mobile application would convey to the web server that the mobile device had entered the Region for the venue. Likewise, when the mobile device exited the Region for the venue, the mobile application would convey to the web server that the mobile device had exited the Region for the venue. The entrance into and exit out of the region may be associated with the anonymous user record for the application user and may be used to refine future search results with the knowledge that the mobile application user had visited the venue in the past.

In the future, when the mobile application user uses the application in a similar geographic location to search for venues, the application may proactively use the information stored with the mobile user record to suggest venues based on previous search keywords and previously visited venues.

Thus, in one example, when search results are returned to the mobile app, the mobile application may establish region monitoring for the locations in the search results. This allows the mobile application to detect when one of those regions has been entered or exited. Region Enter events and Region Exit events are also stored in the database by the web server, further building the mobile user profile historical information. User ratings, reviews, and feedback on the application recommendations may all be requested when a user enters or exits a search result being monitored. As described in U.S. Provisional Application No. 62/171,900 "METHOD FOR TAG BASED FILTERING ON GEOGRAPHIC REGIONS, DIGITAL ASSETS, MESSAGES, AND ANONYMOUS USER PROFILES," the information in the user profile can be matched to information describing a business/region, specific messages pertaining to that business/region, or even specific assets for that region such as pictures or venue reviews.

Figure 11:
FIG. 11 is a representation of the system taking negative user feedback into account on subsequent recommendations.

FIG. 11 illustrates an example mobile application user interface showing the user recommendations based on previous ratings (FIG. 9) and previous recommendation feedback (FIG. 10). In this example, the feedback given in FIG. 9 was not positive for Pizza Restaurant, or that the application user indicated that he did not like the Pizza Restaurant recommendation in FIG. 10. In FIG. 11, the system has removed Pizza Restaurant from the recommendations made to the user based on a rating algorithm that combines the user's preferences with the user's feedback to the system or feedback on the venue.

The search result in FIG. 11 may be presented without the user entering search terms or may be returned based on the user entry of search terms. As illustrated in FIG. 11, the user interface may also prompt the user to enter search terms, if the recommendation does not meet their current interests.

Figure 12:
FIG. 12 is a representation of the system being taking user feedback into account, having a low confidence in the recommendations, and adding a Surprise Me button.

FIG. 12 illustrates an example user interface having a user option to adjust the normally conducted search. In FIG. 12, the user interface provides a "surprise me" button. The selection of this option may cause the web server to perform a search without considering the user profile, or with reduced consideration of the user profile.

This may be helpful when the mobile application user has entered a new region that the user has never visited before. Perhaps this region is Budapest Hungary. None of the user's existing preferences apply to the restaurants in Budapest. The system's rating algorithm recognizes this and displays the 'Surprise Me' button to the user. In one example, when the user chooses the 'Surprise Me' button, the system may examine the restaurant regions for ratings and comments provided by other mobile application users with similar preferences. These ratings, reviews, and recommendations of these similar anonymous users may be used to present a response to the 'Surprise Me' button.

In another example, the "surprise me" option may be presented at the mobile application user interface to show that the system is not confident in its recommendation. Perhaps the user feedback was given in FIG. 9, or the system feedback was not given in FIG. 10, or the recommendation algorithm indicates that the certainty score of the recommendations is weak. In this case, the system would indicate this uncertainty to the mobile application and the mobile application could present the user with a 'Surprise Me' button in addition to the system recommendations.

Figure 16:
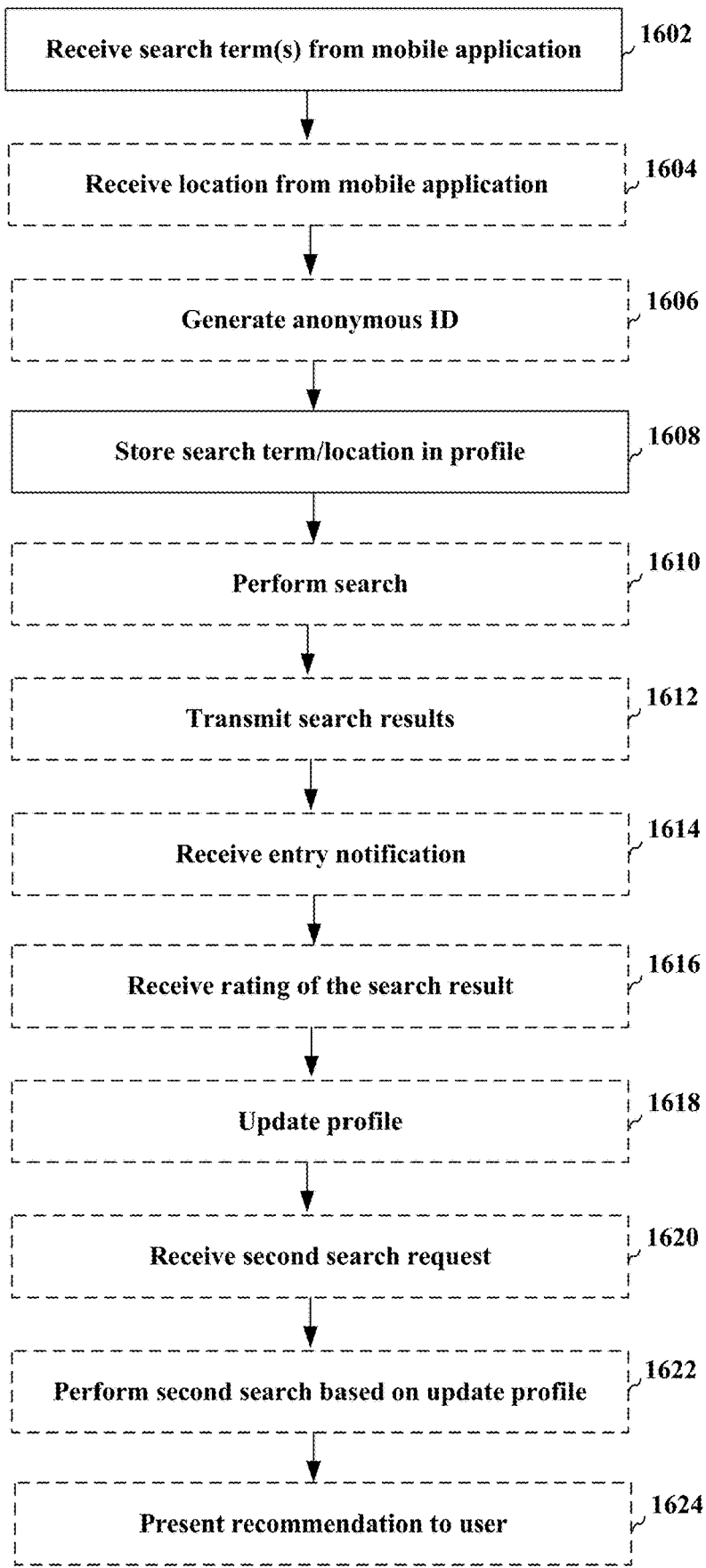
FIG. 16 illustrates an example flowchart of a method maintaining an anonymous user profile at a web service, in accordance with aspects of the present disclosure.

FIG. 16 illustrates an example flowchart of a method maintaining an user profile at a web service. The user profile may be an anonymous profile. The method may be performed, e.g., by a web server in communication with a mobile application at a mobile device (e.g., the web server illustrated in FIGS. 1-6, web server 1326 in FIG. 13. Such a web server apparatus may comprise memory and at least one processor, the at least one processor configured to perform the aspects described in the flowchart of FIG. 16.

For example, at 1602, the web server may receive at least one search term from a mobile application. FIG. 1 and FIG. 6 illustrate examples of the web server receiving a search term. At 1606, the web server may generate an anonymous identifier for the mobile application, as described herein. In another example, a user may log in to the mobile application at their mobile device. Thus, the user profile might be associated with a user identifier and password with which the user logs in to the application such that the web server does not need to generate an anonymous identifier, but instead receives a user identifier from the mobile application.

At 1608, the web server may store the received search term(s) from the mobile application in a profile. If the profile is an anonymous profile, the received search term(s) may be stored in connection with the anonymous identifier in the profile. Thus, the web server may create and store a profile using the identifier, whether an anonymous identifier or other identifier, based on the search term(s).

In addition to receiving the search term at 1602, the web server may also receive a location of the mobile device at the time that the search term was entered, e.g., at 1604. Optional aspects are illustrated in FIG. 16 with a dashed line. The web server may store the received location at 1608 as a part of the stored profile.

At 1610, the web server may perform a search using the at least one search term and the identifier for the mobile device. Then, the web server may transmit a search result at 1612 for the search to the mobile application.

At 1620, the web server may receive a second search request from the same mobile application. The web server may perform a second search at 1622 based at least in part on the stored profile with the search terms/location information from the previous search.

The mobile application may provide enter/exit notifications to the web server regarding regions associated with search results provided by the web server. Thus, at 1614, the web server may receive a notification from the mobile application that a mobile device associated with the mobile application has entered a region associated with the search result. At 1618, the web server may update the profile stored at 1608 to store an indication of the entry using the anonymous identifier. The web server may receive and store additional information in the profile stored at 1608. For example, the web server may receive a rating of the search result at 1616 and may update the profile at 1618 to store the rating of the search result using the anonymous identifier. Then, the search performed, e.g., at 1622, may be based at least in part on the updated profile, e.g., using the indication of the entry into the region, the rating, the additional search terms/locations, etc.

The search result may comprise, e.g., at least one of a business and a venue. The profile may be used to match a user preference to descriptive keywords used to describe the business or venue. The descriptive keywords may describe at least one of a region and a digital asset comprising a photograph or review associated with the business or venue.

The web server may present a recommendation, e.g., at 1624, to a user at the mobile application based on the search.

Figure 17:
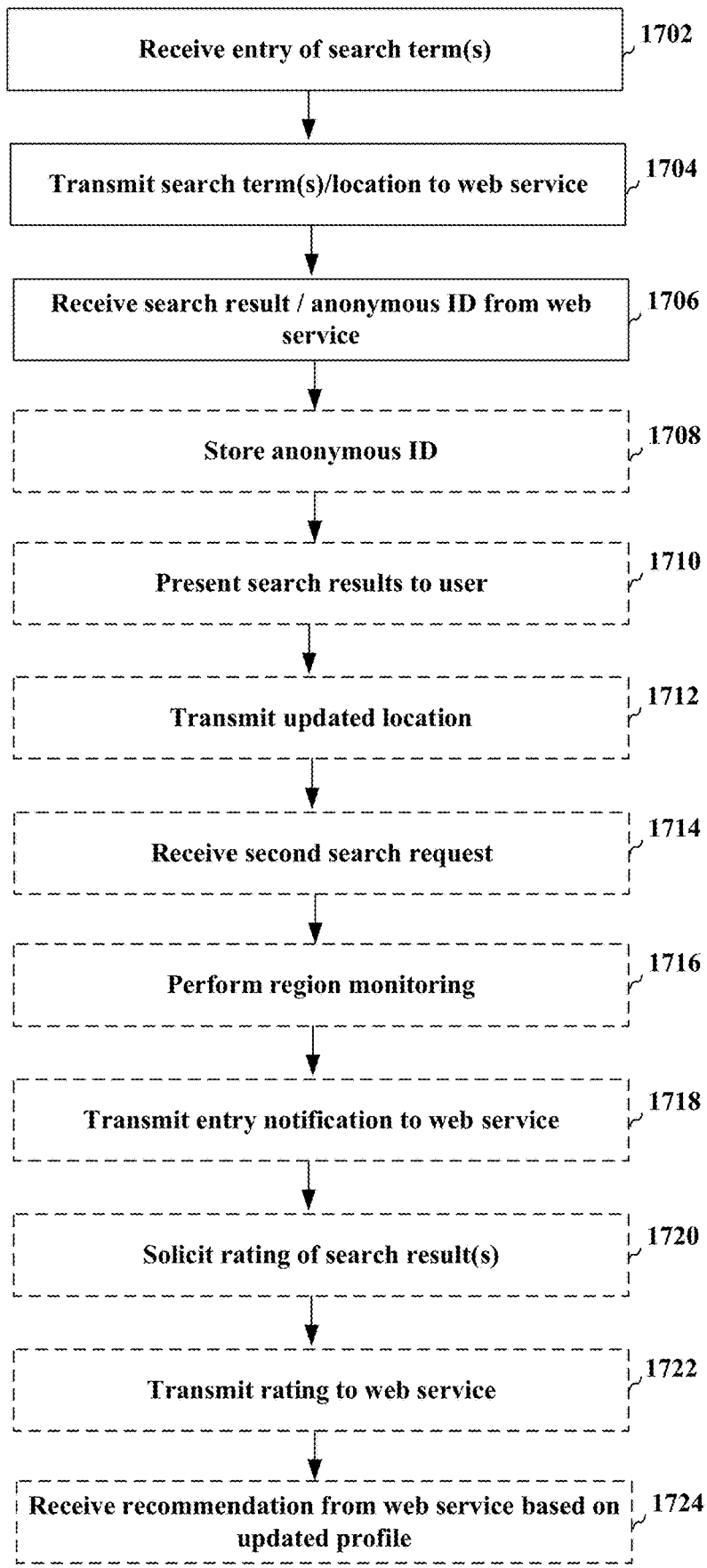
FIG. 17 illustrates an example flowchart of a method of presenting information to a user via a mobile application at a mobile device, in accordance with aspects of the present disclosure.

FIG. 17 illustrates an example flowchart of a method of presenting information to a user via a mobile application at a mobile device. The method may be performed, e.g., by mobile device comprising a mobile application in communication with a web service (e.g., the mobile application/mobile device illustrated in FIGS. 1-6, apparatus 1300 in FIG. 13. At 1702, the mobile application receives entry of at least one search term, e.g., as illustrated in FIGS. 1 and 6. At 1704, the mobile application transmits the at least one search term and a location of the mobile device to a web service. In response, the mobile application receives a search result at 1706 based on the at least one search term, and may also receive an anonymous identifier for the mobile application from the web service. In a second example, a user may log in to the mobile application at their mobile device. Thus, the user profile might be associated with a user identifier and/or password with which the user logs in to the application.

If the mobile application receives an anonymous identifier with the search results at 1706, the mobile application may store the anonymous identifier at 1708. This enables the mobile application and the web service to communicate regarding the user profile in an anonymous manner.

At 1710, the mobile application may present the search results to the user, e.g., by display or audio presentation at the mobile device.

The mobile application may continue to provide additional user information to the web service to be associated with the user profile. For example, at 1712, the mobile application may transmit an updated location of the mobile device to the web service along with an identifier. The identifier may be the anonymous identifier or may be another identifier associated with the user log in information. Then, the mobile application may receive, at 1714, a second search result based on the updated location and a profile stored at the web service.

The mobile application may perform region monitoring for a region associated with the search result at 1716, and may transmit a notification to the web service at 1718 when the mobile device enters the region for use in updating the profile.

The mobile application may solicit, at 1720, a rating of at least one of the search result and a venue associated with the entered region when the mobile device exits the region. The mobile application may transmit at 1722 the rating to the web service for use in updating the profile.

The mobile application may receive a recommendation at 1724 based at least in part on the profile updated with the notification that the mobile device entered the region.

Figure 13:
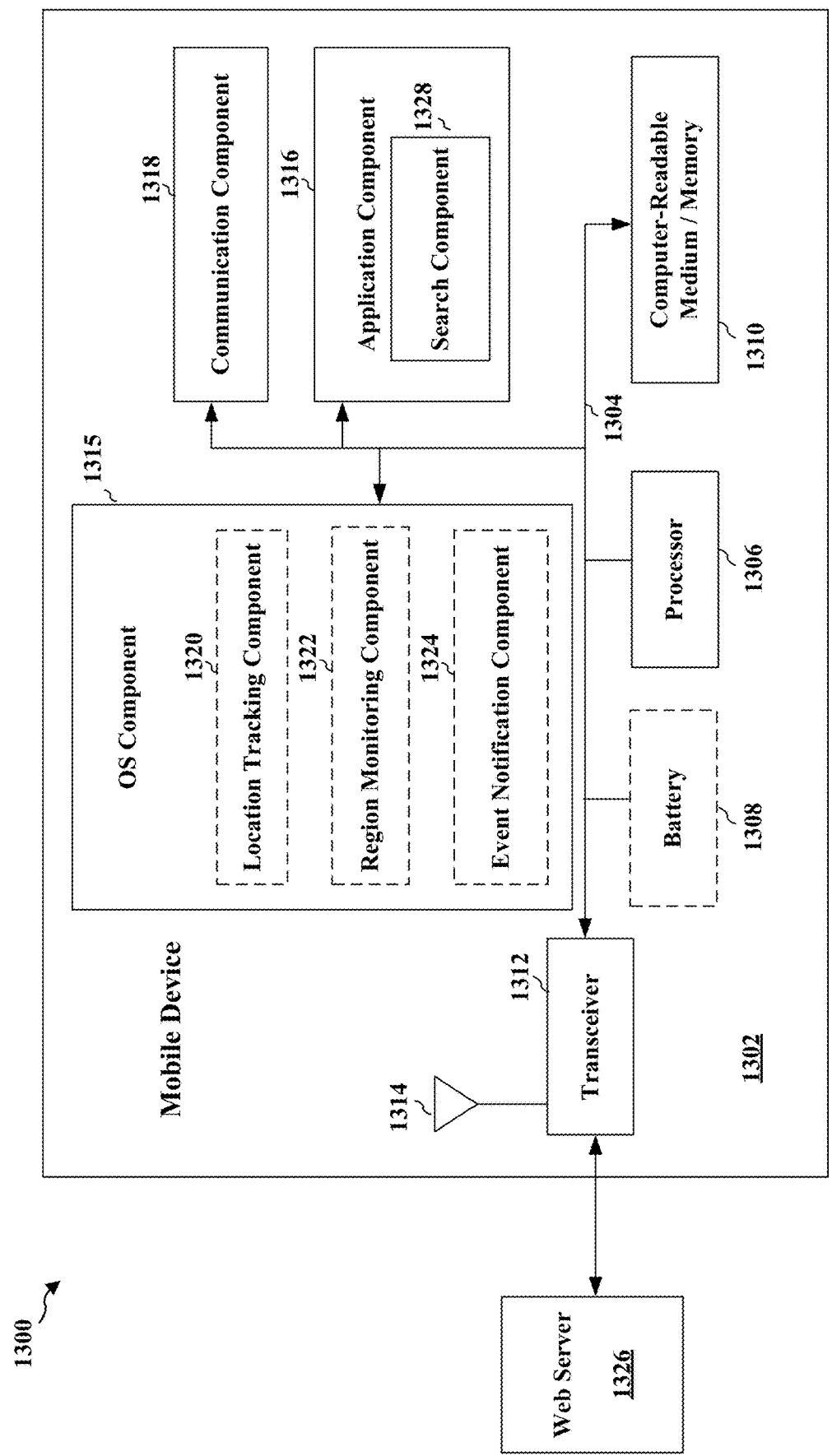
FIG. 13 illustrates is a diagram illustrating an example hardware implementation of a mobile device, in accordance with aspects presented herein.

FIG. 13 is a diagram 1300 illustrating example aspects of a hardware implementation of a mobile device 1302 employing a processing system.

Such a processing system may comprise various circuits including one or more processors and/or components, represented by the processor 1306, the components 1315, 1316, 1318, 1320, 1322, 1324, and 1326, computer-readable medium/memory 1310, and battery 1308, linked to each other by a bus 1304. The bus 1302 may link various other circuits that are not described in detail.

The mobile apparatus may comprise a transceiver 1312 coupled to the processing system. The transceiver 1312 may be coupled to one or more antennas 1314 in order to provide a means for communicating with various other apparatus over a transmission medium. For example, the transceiver may be used to transmit search requests, locations, ratings, and region events, e.g., as described in connection with FIGS. 1-12 and 17, in connection with application 1316 and OS component 1315 to a remote web server 826. Such communication may be performed wirelessly, such as using a cellular network and Wi-Fi, among others. The transceiver 812 may be configured to both receive and process signals, e.g., including signals from a web server such as 1326, and to provide information from the signal to the processing system, e.g., to communication module. For example, the transceiver may receive communication from the web server 1326, such as search results, as described in connection with FIGS. 2, 5, 6, 8, 11, 12, and 17. Communication module 1318 may then provide the information to the application component or to another application component.

Processor 1306 may be configured for general processing, including the execution of software stored on the computer-readable medium/memory 1310. Such software, when executed by the processor 1306, may cause the processing system to perform the various functions described supra. The processing system further includes at least one of the components 1315, 1316, 1318, 1320, 1322, 1324, and 1328. For example, the OS 1315 of the mobile device may comprise, e.g., a location service component 1320 to determine the location of the mobile device, e.g., using any of GPS, Wi-Fi network location mapping component 1324, cellular triangulation, in order to determine location updates that can be communicated to application component 1316, as described supra. Additionally, OS 1315 may include a region monitoring component 1322 that performs region monitoring of regions, as instructed by the application(s) downloaded on the mobile device. As described in connection with FIG. 6, the application component 1316 may instruct the region monitoring component 1322 to monitor a region associated with at least one search result received from the web server. The OS may further include an event notification component 1324 that notifies the application when region Enter events, region Exit events, and personal region Exit events occur. Mobile application component 1316 may further include a search component, as described, e.g., in connection with FIG. 6, that is configured to request search results from the web server 1326, whether based on a location, with or without search terms.

The mobile device 1300 may comprising, e.g., any of means for receiving entry of at least one search term; means for transmitting the at least one search term and a location of the mobile device to a web service; means for receiving a search result based on the at least one search term and a unique anonymous identifier for a mobile application from the web service; means for storing the anonymous identifier; means for performing region monitoring for a region associated with the search result; and means for soliciting a rating of at least one of the search result and a venue associated with the entered region when the mobile device exits the region. Such means may comprise software components running in the processor 1306, resident/stored in the computer readable medium/memory 1310, one or more hardware components coupled to the processor 1306, or some combination thereof. In one example, mobile device may be a smart phone or other smart device.

Aspects may further include a web service apparatus including any of means for means for receiving at least one search term from a mobile application; means for generating a unique anonymous identifier for the mobile application; means for storing the received at least one search term from the mobile application in connection with the anonymous identifier in a profile; means for performing a search using the at least one search term; and means for transmitting a search result for the search to the mobile application.

Similar to that described for the mobile device, such means may comprise software components running in a processor at a web server, resident/stored in the computer readable medium/memory at a web server, one or more hardware components coupled to the processor at a web server, or some combination thereof.

Figure 14:
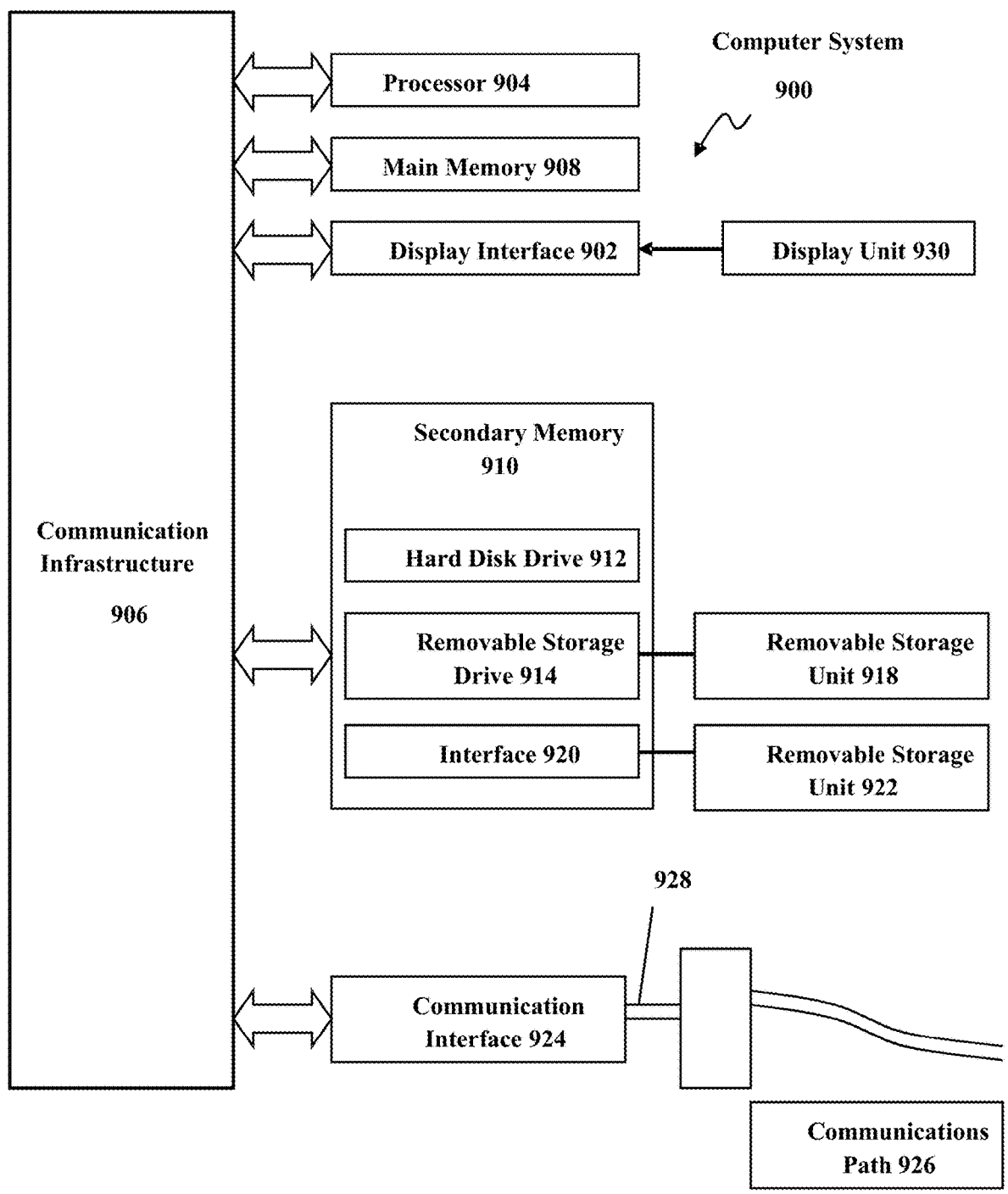
FIG. 14 illustrates a diagram of various example system components, in accordance with aspects of the present disclosure.

FIG. 14 presents an example system diagram of various hardware components and other features, for use in accordance with aspects presented herein. Both the web server and the mobile device may include aspects described in connection with FIG. 14. The aspects may be implemented using hardware, software, or a combination thereof and may be implemented in one or more computer systems or other processing systems. In one example, the aspects may include one or more computer systems capable of carrying out the functionality described herein. An example of such a computer system 1400 is shown in FIG. 14.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 912, and signals 928. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 910 to perform the features presented herein. Accordingly, such computer programs represent controllers of the computer system 900.

In aspects implemented using software, the software may be stored in a computer program product and loaded into computer system 900 using removable storage drive 914, hard drive 912, or communications interface 920. The control logic (software), when executed by the processor 904, causes the processor 904 to perform the functions as described herein.

In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 15:
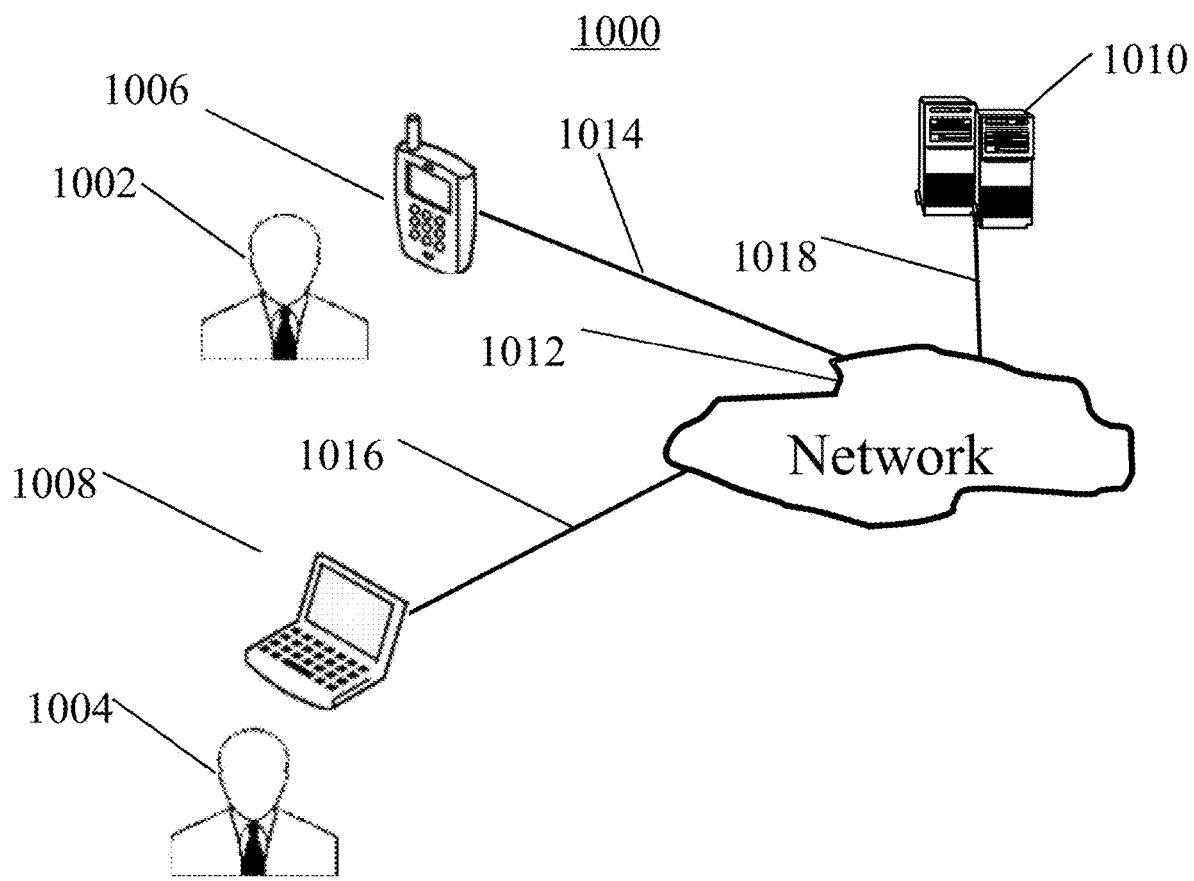
FIG. 15 illustrates an example system, in accordance with aspects of the present disclosure.

FIG. 15 is a block diagram of various example system components, in an example communication system 1000 usable in accordance with aspects presented herein. The communication system 1000 includes one or more accessors 1002 and 1004 (also referred to interchangeably herein as one or more "users") and one or more terminals 1006, 1008. In one aspect, data for use in accordance aspects presented herein, for example, may be input and/or accessed by accessors 1002, 1004 via terminals 1006, 1008, such as telephonic devices, smart devices, wireless devices, such as personal digital assistants ("PDAs") or a hand-held wireless devices coupled to a server 1010, such as a PC, minicomputer, mainframe computer, microcomputer, or other device having a processor and a repository for data and/or connection to a repository for data, via, for example, a network 1012, such as the Internet or an intranet, and couplings 1014, 1016, and 1018. The couplings 1014, 1016, and 1018 may include, for example, wired, wireless, or fiber optic links. For example, a wireless coupling may comprise a cellular communication link (3G, 4G, LTE or future cellular protocol) or Wi-Fi connection.

Aspects of this application relate to U.S. application Ser. No. 14/145,391, titled "SYSTEM AND METHOD FOR ANONYMOUS DELIVERY OF GEOGRAPHICALLY SPECIFIC RICH MEDIA INFORMATION and filed on Dec. 31, 2013; U.S. application Ser. No. 14/616,400, titled "METHOD FOR OPTIMIZING MOBILE DEVICE BATTERY USE WHILE TRACKING THE LOCATION OF AN ANONYMOUS MOBILE DEVICE and filed on Feb. 6, 2015; U.S. Provisional Application No. 62/137,046, titled "METHOD FOR OPTIMIZING MOBILE DEVICE REGION MONITORING AND REGION MANAGEMENT FOR AN ANONYMOUS MOBILE DEVICE and filed on Mar. 23, 2015; U.S. Provisional Application No. 62/171,900, titled "METHOD FOR TAG BASED FILTERING ON GEOGRAPHIC REGIONS, DIGITAL ASSETS, MESSAGES, AND ANONYMOUS USER PROFILES" and filed on Jun. 5, 2015; and U.S. Provisional Application No. 62/214,686, titled "BATTERY EFFICIENT HYBRID MOBILE DEVICE LOCATION MONITORING" and filed on Sep. 4, 2015, the entire contents of each of which are incorporated herein by reference.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

The invention claimed is:

1. A method for maintaining a user profile at a web service, the method comprising:

receiving, at the web service, an anonymous token from a mobile application, the anonymous token originating from a notification service and does not include personally identifiable information;

generating, at the web service, an anonymous identifier for the mobile application based on the anonymous token received from the mobile application;

transmitting the anonymous identifier to the mobile application;

receiving a first search request from the mobile application having the anonymous identifier, the first search request comprising at least one search term from the mobile application associated with a mobile device;

performing a first search using the at least one search term from the mobile application;

transmitting a first search result for the first search to the mobile application for display at the mobile device;

generating a profile associated with the anonymous identifier for the mobile application;

storing, at the web service, the received at least one search term from the mobile application in connection with the anonymous identifier in the profile;

receiving, at the web service, a notification from the mobile application that the mobile device associated with the mobile application having the anonymous identifier has entered a region associated with the first search result that was previously provided to the mobile application for the display at the mobile device; and updating, at the web service, the profile associated with the anonymous identifier to store an indication of entry of the region associated with the first search result that was previously provided to the mobile application for the first search request comprising the at least one search term.

2. The method of claim 1, further comprising:

receiving a location from the mobile application in connection with receipt of the at least one search term; and storing the received location in the profile having the anonymous identifier.

3. The method of claim 1, wherein the web service transmits the first search result as one of multiple search results for the first search received from the mobile application.

4. The method of claim 3, further comprising:
receiving, at the web service, a second search request from the mobile application;
performing, at the web service, a second search based at least in part on the profile that is updated with the indication of the entry of the region associated with the first search result for the first search request; and
transmitting second search result for the second search request to the mobile application for display at the mobile device.

5. The method of claim 3, further comprising:
performing an additional search based at least in part on the profile having the anonymous identifier and using the indication of the entry into the region associated with the first search result for the first search request comprising the at least one search term.

6. The method of claim 5, further comprising:
presenting a recommendation to a user at the mobile application based on the additional search.

7. The method of claim 1, further comprising:
receiving a rating of a recommendation provided in response to the at least one search term; and
updating the profile to store the rating of the recommendation provided in response to the at least one search term using the anonymous identifier.

8. The method of claim 1, wherein the first search result comprises at least one of a business and a venue, and wherein the profile is used to match a user preference to descriptive keywords used to describe the business or the venue.

9. The method of claim 8, wherein the descriptive keywords describe at least one of a geographic region and a digital asset comprise a photograph or review associated with the business or the venue.

10. The method of claim 5, further comprising:
adjusting an order of presentation of additional search results based on the additional search based on the entry into the region associated with the first search result for the first search request comprising the at least one search term.

11. A web service apparatus, comprising:
a memory; and
at least one processor coupled to the memory and configured to:
receive, at the web service, an anonymous token from a mobile application, the anonymous token originating from a notification service and does not include personally identifiable information;
generate, at the web service apparatus, an anonymous identifier for the mobile application based on the anonymous token received from the mobile application;
transmit the anonymous identifier to the mobile application;
receive a first search request from the mobile application having the anonymous identifier, the first search request comprising at least one search term from the mobile application associated with a mobile device;
perform a first search using the at least one search term from the mobile application;
transmit a first search result for the first search to the mobile application for display at the mobile device;
store the received at least one search term from the mobile application in connection with the anonymous identifier in a profile;
receive, at the web service apparatus, a notification from the mobile application that the mobile device associated with the mobile application having the anonymous identifier has entered a region associated with the first search result that was previously provided to the mobile application for the display at the mobile device; and
update the profile associated with the anonymous identifier to store an indication of entry of the region associated with the first search result for the first search request comprising the at least one search term.

12. A method of presenting information to a user via a mobile application at a mobile device, comprising:
receiving an anonymous token from a notification service, the anonymous token not including personally identifiable information;
registering with a web service using the anonymous token that does not include the personally identifiable information;
receiving, from the web service, an anonymous identifier for the mobile application at the mobile device;
storing the anonymous identifier;
receiving entry of a search request comprising at least one search term;
transmitting the at least one search term and a location of the mobile device to the web service with an indication of the anonymous identifier;
receiving a search result based on the at least one search term from the web service;
displaying the search result to the user;
performing region monitoring for a region associated with the search result that was received from the web service in response to the search request comprising the at least one search term; and
transmitting a notification associated with the anonymous identifier to the web service for use in updating a user profile when the mobile device enters the region associated with the search result that was received from the web service in response to the search request comprising the at least one search term.

13. The method of claim 12, further comprising:
transmitting an updated location of the mobile device to the web service along with the anonymous identifier; and
receiving a second search result based on the updated location and the user profile stored at the web service.

14. The method of claim 12, further comprising:
receiving a recommendation based at least in part on the user profile updated with the notification that the mobile device entered the region associated with the search result that was received from the web service in response to the search request comprising the at least one search term.

15. The method of claim 12, further comprising:
soliciting a rating of a recommendation provided in response to the search result for the search request comprising the at least one search term; and
transmitting the rating of the recommendation provided in response to the search result to the web service for use in updating the user profile.

* * * * *